Figure 1:
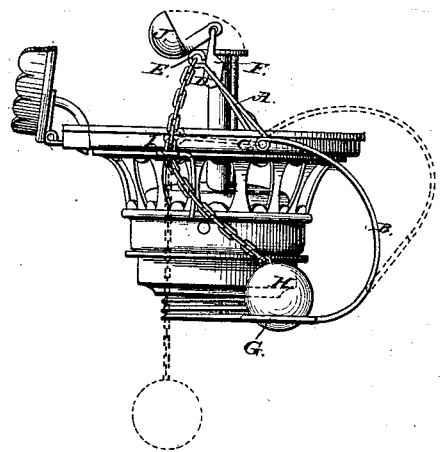
Figure 2:
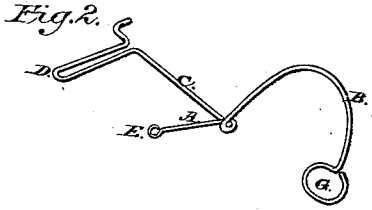

L. HOURIET.
LAMP-EXTINGUISHER.

No. 179,657.    Patented July 11, 1876.

Attest:
J. H. Clayton
P. M. Turner

Inventor:
Lucien Houriet

UNITED STATES PATENT OFFICE

LUCIEN HOURIET, OF SAN JOSÉ, CALIFORNIA.

IMPROVEMENT IN LAMP-EXTINGUISHERS.

Specification forming part of Letters Patent No. 179,657, dated July 11, 1876; application filed January 14, 1876.

*To all whom it may concern:*

Be it known that I, LUCIEN HOURIET, of San José, in the county of Santa Clara and State of California, have invented a new and useful Improvement in Lamp - Flame Extinguisher, which improvement is fully set forth in the following specification, reference being had to the accompanying drawings.

My invention has for its object to provide against accidents, and to extinguish a lamp-flame when the lamp is accidentally upset.

I have a lever, with an arm, A, with an eye, E, at its end, and an arm, B, which is an extension of arm A. I have provided a ring or rest, G, for ball H. Ball H has a chain or cord, by which it is attached to the eye E at the end of arm A, the chain or cord passing down through the eye of stationary arm I.

The weight of ball H, when placed upon rest G, will act immediately upon lever C, which lever C has an elbow, D. Elbow D is attached to link F, and link F is attached to cap or cover J.

The ball H, when placed on rest G, will cause the above-described parts to move forward and throw cap J back or away from lamp tube or flame, and when the ball H is taken off of rest G and let hang loosely by the chain or cord, the weight of ball H will act upon arm A and cause a backward motion of lever C and elbow D, and throw cap J forward and cover lamp tube or flame, and thereby extinguish lamp-flame.

I am aware that the hinged cap with a weight, and one without a weight, also a chain and ball, are nothing new.

Having thus described my invention, what I claim as new is—

The arm A, having eye E, arm B, having rest G, lever C, having elbow D, the link F, cap J, and ball, all combined substantially as and for the purpose described.

LUCIEN HOURIET.

Witnesses:
W. P. NEUVE,
HENRY PIESSNECKER.